(12) United States Patent
Hunt

(10) Patent No.: US 8,200,093 B2
(45) Date of Patent: Jun. 12, 2012

(54) MULTI-CHANNEL OPTICAL RELAYS FOR ENABLING A NETWORKED COMMUNICATIONS SYSTEM

(75) Inventor: Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 929 days.

(21) Appl. No.: 12/239,053

(22) Filed: Sep. 26, 2008

(65) Prior Publication Data

US 2010/0080566 A1    Apr. 1, 2010

(51) Int. Cl.
*H04B 10/00* (2006.01)

(52) U.S. Cl. ........ 398/115; 398/119; 398/125; 398/126; 398/131

(58) Field of Classification Search .......... 398/115, 398/118–121, 126, 131, 135, 173; 348/14.01, 348/14.02, 14.09; 340/531; 370/260, 261, 370/466; 710/62, 63, 100, 304; 455/414.1
See application file for complete search history.

(56) References Cited

U.S. PATENT DOCUMENTS

| | | | | |
|---|---|---|---|---|
| 6,381,055 B1 * | 4/2002 | Javitt et al. | ..................... | 398/131 |
| 6,501,582 B2 * | 12/2002 | Chiou et al. | ................... | 398/126 |
| 6,657,783 B1 * | 12/2003 | Presby et al. | ................. | 359/399 |
| 6,751,455 B1 * | 6/2004 | Acampora | ................. | 455/414.1 |
| 6,763,196 B2 * | 7/2004 | Yafuso | .......................... | 398/156 |
| 6,970,651 B1 * | 11/2005 | Schuster et al. | .............. | 398/131 |
| 6,978,093 B2 * | 12/2005 | Clark | ............................ | 398/124 |
| 7,457,545 B2 * | 11/2008 | Wirth et al. | ................... | 398/119 |
| 7,474,326 B2 * | 1/2009 | Le Pennec | ................. | 348/14.09 |
| 7,486,893 B1 * | 2/2009 | Pepper et al. | ................. | 398/119 |
| 8,050,568 B2 * | 11/2011 | Hunt | ............................. | 398/115 |
| 8,090,264 B2 * | 1/2012 | Hunt | ............................. | 398/131 |

OTHER PUBLICATIONS

Global Security webpage: http://www.globalsecurity.org/space/systems/arms.htm Titled: Relay Mirror Technology Advanced Relay Mirror System (ARMS) dated Sep. 18, 2008—page attached.

* cited by examiner

*Primary Examiner* — Loha Ben
(74) *Attorney, Agent, or Firm* — Klintworth & Rozenblat IP LLC

(57) ABSTRACT

A free-space optical communications network for allowing a plurality of geographically-distributed users to communicate may include free-space multi-channel relay converters for tracking a plurality of users, and a connection system in communication with each of the plurality of multi-channel relay converters. The connection system may include an internal alignment reference and steering mirrors. Each free-space multi-channel relay converter may be adapted to align with the internal alignment reference. The connection system may be adapted to align the plurality of free-space multi-channel relay converters with one another to allow the plurality of geographically-distributed users to communicate.

20 Claims, 2 Drawing Sheets

MULTI-CHANNEL OPTICAL RELAYS FOR ENABLING A NETWORKED COMMUNICATIONS SYSTEM

FIELD OF THE INVENTION

The present disclosure relates to free-space optical communications networks for allowing users to communicate with one another on an ad hoc basis.

BACKGROUND

Light travels in straight lines requiring point-to-point architectures. For communications systems, straight optical lines, so called enabled lines of sight geometries, may be rare. In the commercial sector, this challenge has been largely solved by the creation of the physical layer for the internet. In commercial internet based systems, light is transmitted via fiber optics, occasionally referred to as optical waveguides, which may allow the light to follow a well-defined, confined geometry. The fiber may follow any geometric path, with the communications light following an arbitrary path. However, this solution will not work for airborne or free-space environments as optical fibers may not be strung between planes or other mobile communicators. Heritage communications systems, for example, those that operate in the microwave or RF regimes, operate in spectral regions which have higher transparency. The longer wavelengths in those spectral areas cause the beam to diffract and spread much faster as they propagate. However, the longer wavelengths have carrier frequencies orders of magnitude lower than the optical regime. As a result, they may have intrinsically slower data rates. At times, communications may require higher bandwidths implying operation at the higher carrier rates associated with optical frequencies. RF and microwave carrier frequencies may have limited bandwidth capabilities due to lower carrier frequencies. The prior art may not provide for a free-space communication system operating at optical frequencies, which may allow communication between multiple users in an ad hoc, stochastic, temporal environment.

A free-space optical communications network and/or method of users communicating using a free-space optical communications network is needed to address one or more problems associated with one or more of the existing communications networks and/or methods of communication.

SUMMARY

In one embodiment, a free-space optical communications network for allowing a plurality of users to communicate is disclosed. The free-space optical communications network may include a plurality of free-space multi-channel relay converters for tracking a plurality of users, and a connection system in communication with each of the plurality of multi-channel relay converters. The connection system may include an internal alignment reference and steering mirrors. Each free-space multi-channel relay converter may be adapted to align with the internal alignment reference. The connection system may be adapted to align the plurality of free-space multi-channel relay converters with one another to allow a plurality of users to communicate.

In another embodiment, a method of users communicating using a free-space optical communications network is disclosed. In one step, a plurality of free-space multi-channel relay converters may be provided. In another step, a connection system may be provided comprising an internal alignment reference and steering mirrors. In an additional step, the users may be tracked using the free-space multi-channel relay converters. In still another step, each of the free-space multi-channel relay converters may be aligned to the internal alignment reference of the connection system. In yet another step, the free-space multi-channel relay converters may be aligned to one another using the connection system to allow the users to communicate.

In still another embodiment, a connection system is disclosed for allowing users to communicate. The connection system may comprise an internal alignment reference and steering mirrors. The internal alignment reference may be for aligning with a plurality of free-space multi-channel relay converters to allow users to communicate.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
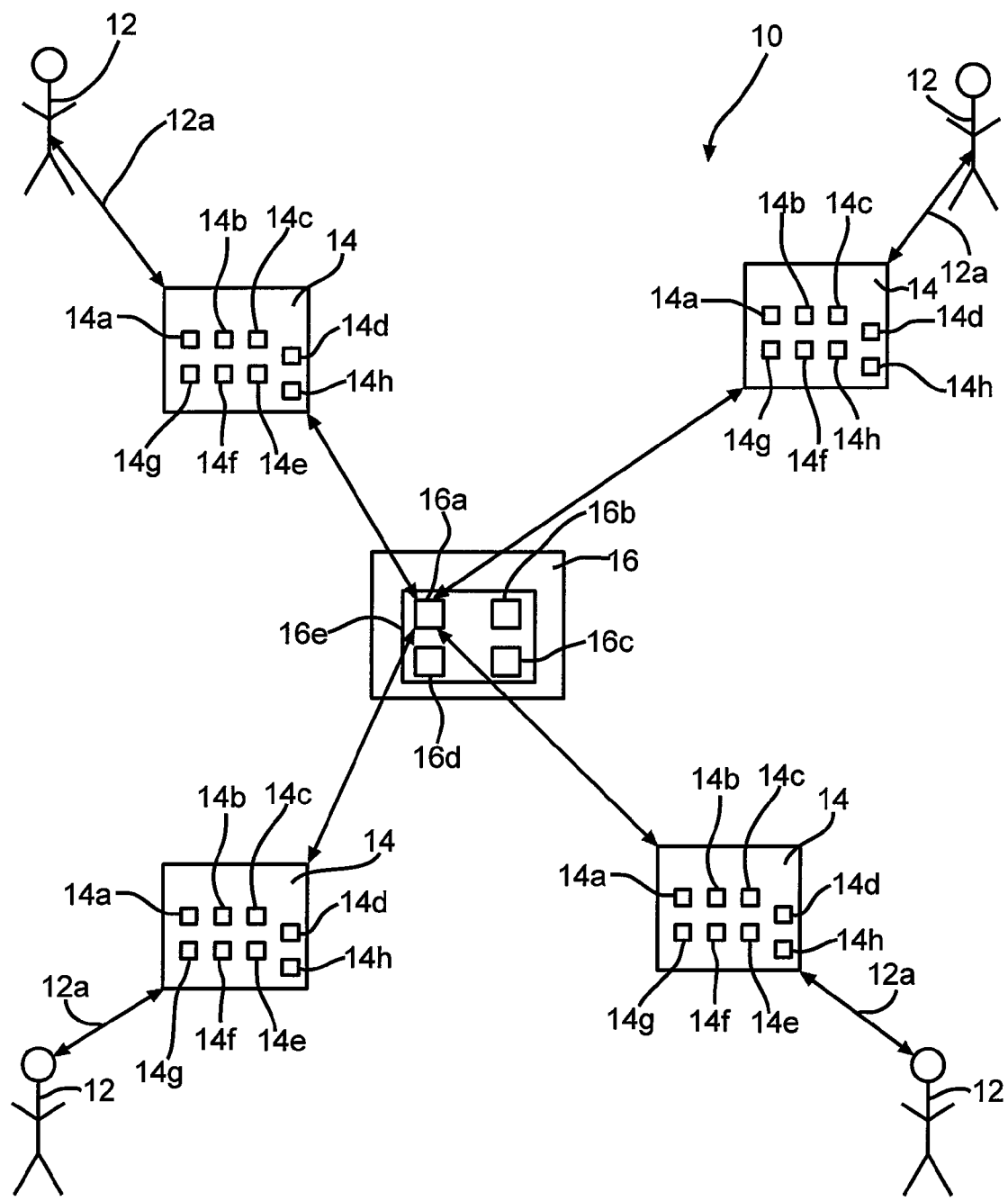
FIG. 1 is a box diagram illustrating an exemplary embodiment of a free-space optical communications network.

FIG. 1 is a box diagram of one embodiment of a free-space optical communications network 10 which may be adapted to allow a plurality of geographically distributed users 12 to communicate using optical propagation even if the users 12 may not be aligned in a "line of sight." The network 10 may be ground-based, air-based, or space-based. The network 10 may comprise a plurality of free-space multi-channel relay converters 14 for tracking the users 12, and a connection system 16 in communication with each of the plurality of multi-channel relay converters 14. There may be a separate free-space multi-channel relay converter 14 for every user 12. Each user 12 may emit a signal beam 12a. Each of the separate free-space multi-channel relay converters 14 may be adapted to independently track a separate respective user 12. The network 10 may comprise three or more multi-channel relay converters 14, and three or more users 12.

Each of the free-space multi-channel relay converters 14 may comprise the following functionally cooperative elements: an optical telescope 14a for collecting and propagating light; a detector 14b for detecting light; an alignment cube 14c for providing location information to a user 12; an alignment laser 14d for finding and tracking a user 12; intensity conditioning optics 14e; polarization conditioning optics 14f; wavelength and optical bandwidth conditioning optics 14g; and optionally may additionally comprise adaptive optics 14h. In other embodiments, the free-space multi-channel relay converters 14 may comprise any combination and/or number of the listed components 14a through 14h. In still other embodiments, other types of components may be used.

The optical telescope 14a may be comprised of one or more optical elements, of either refractive or reflective nature. The optical design is meant only to collect electromagnetic radiation and does not need to image the users 12 in question. The detector 14b may be a simple photodiode which looks only for intensity or it may be an imaging plane, useful for physically locating the user 12. The alignment cube 14c may be a corner cube, composed of three mutually perpendicular reflective planes. The corner cube may have the property that any light pointed at it will be reflected along a path parallel to the incoming light. As such, it may send a return signal to an illumination source, providing a highly visible location signal for tracking. The alignment laser 14d may be any of several types, but a solid state medium laser, including diode lasers, are the preferable types. The laser 14d may be mounted on the side of the telescope 14a or it may be mounted in such a way as to propagate out through the telescope 14a. The intensity conditioning optics 14e may include optical filters or may include other control techniques, such as polarizer/rotator combinations. The polarization conditioning optics 14f may include optical elements which may have polarization sensitivity. This may include polarizers, but may also include other polarization sensitive optical elements, such as waveplates. The bandwidth elements of the wavelength and optical bandwidth conditioning optics 14g will typically be an interference filter, such as a Fabry-Perot interferometer, and the wavelength control will typically have a broader spectral effect, such as a spectral filter or diffraction grating.

The connection system 16 may include an internal alignment reference 16a and steering mirrors 16b in cooperation with each other. In one embodiment, there may be one set of steering mirrors 16b for each of the free-space multi-channel relay converters 14. The internal alignment reference 16a may comprise a point in three-dimensional-space such as a hard target, or a light spot exiting an optical fiber, or a hard target located at the end of a fiber. In other embodiments, the internal alignment reference 16a may comprise varied types of internal alignment references. The connection system 16 may further comprise a combination of optical beam splitters 16c and combiners 16d for aligning the plurality of free-space multi-channel relay converters 14 with one another to allow the users 12 to communicate. The fiber optics 16e of the connection system 16 may comprise one or more of the internal alignment reference 16a, steering mirrors 16b, optical beam splitters 16c, and combiners 16d. Each of the free-space multi-channel relay converters 14 may be adapted to independently align itself with the internal alignment reference 16a. The connection system 16 may be adapted to align the plurality of free-space multi-channel relay converters 14 with one another to allow the users 12 to communicate.

Figure 2:
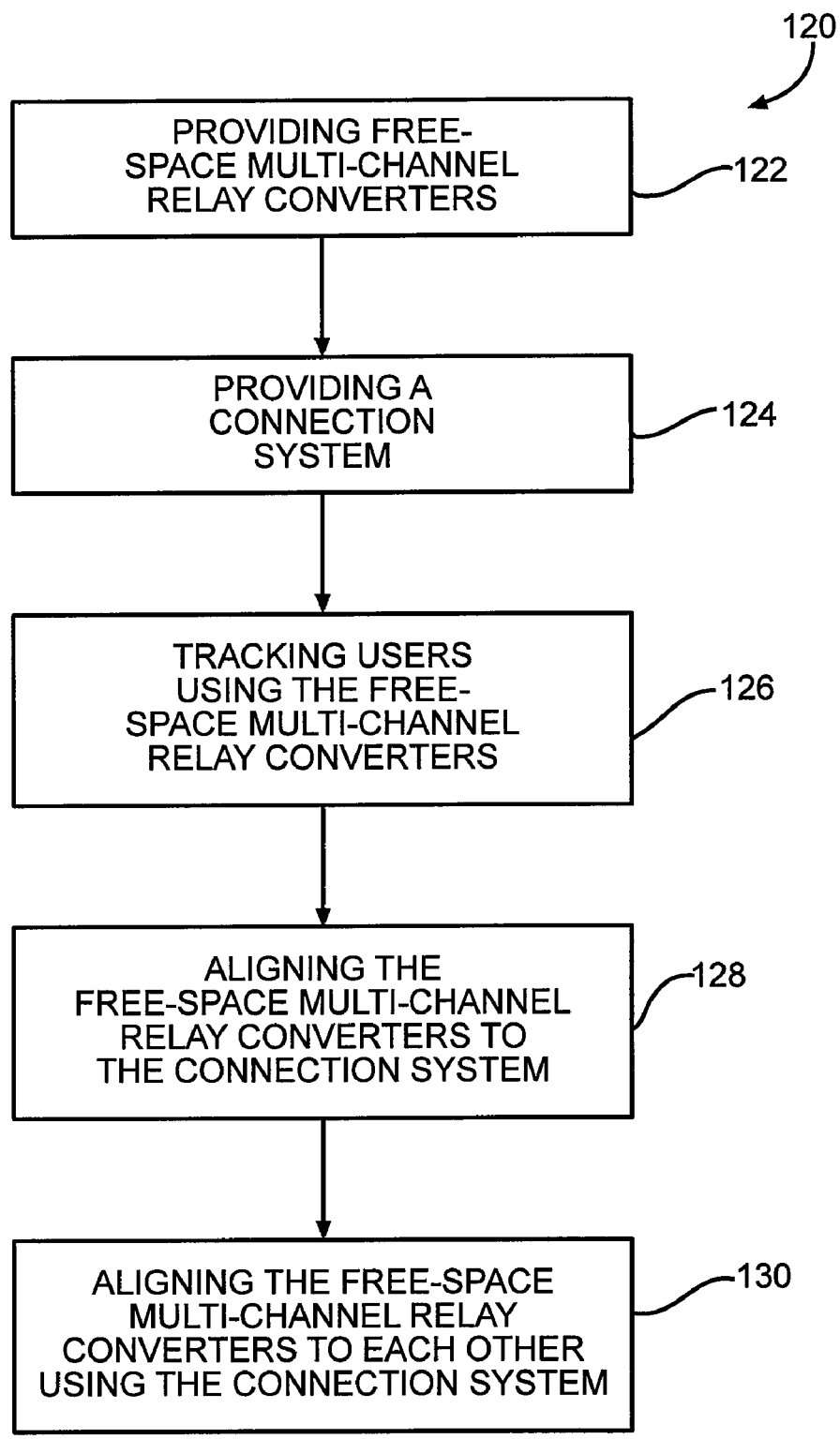
FIG. 2 is a flowchart illustrating an exemplary embodiment of a method of users communicating with one another using a free-spaced optical communications network. As used herein, the term exemplary indicates an example and not necessarily an ideal.

FIG. 2 is a flowchart of one embodiment of a method 120 of users 12 communicating with one another using a free-spaced optical communications network 10. In one step 122, a plurality of free-space multi-channel relay converters 14 may be provided. Each of the provided free-space multi-channel relay converters 14 may comprise: an optical telescope 14a for collecting and propagating light; a detector 14b for detecting light; an alignment cube 14c for providing location information to a user 12; an alignment laser 14d for finding and tracking a user 12; intensity conditioning optics 14e; polarization conditioning optics 14f; wavelength and optical bandwidth conditioning optics 14g; and optionally may additionally comprise adaptive optics 14h. In other embodiments, the free-space multi-channel relay converters 14 may comprise any combination and/or number of the listed components 14a through 14h. In still other embodiments, other types of components may be used. At least three multi-channel relay converters 14 may be provided and there may be a separate free-space multi-channel relay converter 14 for each user 12.

In another step 124, a connection system 16 may be provided comprising an internal alignment reference 16a and steering mirrors 16b. The provided connection system 16 may comprise a combination of optical beam splitters 16c and combiners 16d.

In still another step 126, the users 12 may be tracked using the free-space multi-channel relay converters 14. Each of the users 12 may be independently tracked using a separate respective free-space multi-channel relay converter 14. The tracking may be done using a combination of course and fine tracking using an alignment laser 14d of each free-space multi-channel relay converter 14, and a signal beam 12a from each user 12.

In another step 128, each of the free-space multi-channel relay converters 14 may be aligned to the internal alignment reference 16a of the connection system 16. Each of the free-space multi-channel relay converters 14 may independently align itself with the internal reference 16a.

In yet another step 130, the free-space multi-channel relay converters 14 may be aligned to one another using the connection system 16 to allow the users 12 to communicate. This alignment may be done utilizing steering optics 16e of the connection system 16 which may comprise one or more of the internal alignment reference 16a, steering mirrors 16b, optical beam splitters 16c, and combiners 16d.

One or more embodiments of the disclosure may provide a system or method for allowing users to communicate in a geographically-distributed optical communications network, which may be ground-based, air-based, or space-based and/or which may be deployed in a battle-space, strategic or tactical. The connections, while provided on an ad hoc basis, may be accomplished without the individual users acting as their own connection facilitators. This may provide for light operating at optical wavelengths, such as 100 to 0.1 microns, to reach any point within the operational environment, even when there is no clear "line of sight." The disclosure may improve communications and may reduce costs over one or more of the prior art systems and/or methods of communication.

It should be understood, of course, that the foregoing relates to exemplary embodiments of the disclosure and that modifications may be made without departing from the spirit and scope of the disclosure as set forth in the following claims.

The invention claimed is:

1. A free-space optical communications network for allowing a plurality of users to communicate comprising:
   a plurality of free-space multi-channel relay converters for tracking a plurality of users; and
   a connection system in communication with each of said plurality of multi-channel relay converters, wherein the connection system comprises at least an internal alignment reference and steering mirrors cooperatively functioned to align the plurality of free-space multi-channel relay converters with one another to allow a plurality of users to communicate, and wherein each free-space multi-channel relay converter is adapted to align with the internal alignment reference.

2. The free-space optical communications network of claim 1 wherein each of the free-space multi-channel relay converters comprises the following inter-functional elements: an optical telescope for collecting and propagating light from another one of the free-space multi-channel relay converters, a detector for detecting light from another one of the free-space multi-channel relay converters, an alignment cube for providing location information to a user, an alignment laser for finding and tracking a user, intensity conditioning optics for conditioning intensity of light, polarization conditioning optics for conditioning polarization of light, wavelength and optical bandwidth conditioning optics for conditioning wavelength and bandwidth of light, and adaptive optics for adapting light into a useable form, or any combination thereof.

3. The free-space optical communications network of claim 1 wherein the connection system comprises a plurality of optical beam splitters and combiners for aligning the plurality of free-space multi-channel relay converters with one another to allow a plurality of users to communicate.

4. The free-space optical communications network of claim 1 wherein there are at least three free-space multi-channel relay converters and there is a separate free-space multi-channel relay converter for every user.

5. The free-space optical communications network of claim 1 wherein each of the free-space multi-channel relay converters is adapted to independently align with the internal alignment reference and to independently track a separate user.

6. A method of users communicating using a free-space optical communications network comprising:
   providing a plurality of free-space multi-channel relay converters;
   providing a connection system comprising an internal alignment reference and steering mirrors;
   tracking the users using the free-space multi-channel relay converters;
   aligning each of the free-space multi-channel relay converters to the internal alignment reference of the connection system; and
   aligning the free-space multi-channel relay converters to one another using the connection system to allow the users to communicate.

7. The method of claim 6 wherein each of the provided free-space multi-channel relay converters comprises an optical telescope, a detector for detecting light, an alignment corner cube, an alignment laser, intensity conditioning optics for conditioning intensity of light, polarization conditioning optics for conditioning polarization of light, and wavelength and optical bandwidth conditioning optics for conditioning wavelength and bandwidth of light.

8. The method of claim 6 wherein the provided connection system comprises a combination of optical beam splitters and combiners.

9. The method of claim 6 wherein at least three free-space multi-channel relay converters are provided and there is a separate free-space multi-channel relay converter for every user.

10. The method of claim 6 wherein each of the free-space multi-channel relay converters independently align with the internal alignment reference.

11. The method of claim 6 wherein each of the free-space multi-channel relay converters independently tracks separate users.

12. The method of claim 6 wherein the tracking step utilizes course and fine tracking.

13. The method of claim 12 wherein the tracking step utilizes an alignment laser of each free-space multi-channel relay converter, and a signal beam from each user.

14. The method of claim 6 wherein the step of aligning the free-space multi-channel relay converters to one another using the connection system utilizes the internal alignment reference and the steering mirrors.

15. A connection system for allowing users to communicate comprising:
   fiber optics comprising at least an internal alignment reference and steering mirrors, cooperatively functioned to align a plurality of free-space multi-channel relay converters to allow users to communicate.

16. The connection system of claim 15 wherein there is one set of steering mirrors for each free-space multi-channel relay converter.

17. The connection system of claim 15 wherein the internal alignment reference comprises at least one of a point in three-dimensional space, a hard target, a light spot exiting an optical fiber, or a hard target located at the end of a fiber.

18. The connection system of claim 15 further comprising a combination of optical beam splitters and combiners.

19. The connection system of claim 15 further comprising optical beam splitters, or combiners, or any combination thereof.

20. The connection system of claim 15 wherein the connection system aligns a plurality of free-space multi-channel relay converters tracking users with one another to allow the users to communicate.

* * * * *